United States Patent [19]

Blakley et al.

[11] E Re. 28,677

[45] Reissued Jan. 13, 1976

[54] WASTE TREATMENT SYSTEM

[75] Inventors: Earl T. Blakley, Cincinnati; David E. Chupka, Middletown; David L. Harbron, Jr., Wisconsin Rapids; Paul G. Marsh, Hamilton; Peter Seifert, Middletown, all of Ohio

[73] Assignee: Black Clawson Fibreclaim, Inc., Middletown, Ohio

[22] Filed: June 21, 1974

[21] Appl. No.: 481,882

Related U.S. Patent Documents

Reissue of:

[64] Patent No.: 3,713,594
Issued: Jan. 30, 1973
Appl. No.: 151,762
Filed: June 10, 1971

U.S. APPLICATION:

[62] Division of Ser. No. 6,041, Jan. 26, 1970, Pat. No. 3,549,092, and Ser. No. 861,778, Sept. 28, 1969, Pat. No. 3,595,488.

[52] U.S. Cl. ..... 241/46.08; 241/46.17; 241/86; 241/194

[51] Int. Cl.[2] ..... B02C 13/16

[58] Field of Search ..... 241/43, 46, 46.06, 46.08, 241/46.11, 46.17, 86, 90, 194

[56] References Cited

UNITED STATES PATENTS

| | | | |
|---|---|---|---|
| 2,970,777 | 2/1961 | Hardy et al. | 241/46.08 |
| 3,073,535 | 1/1963 | Vokes | 241/46.11 |
| 3,305,180 | 2/1967 | Tomlinson | 241/46.11 X |
| 3,339,851 | 9/1967 | Felton et al. | 241/46.17 |
| 3,380,669 | 4/1968 | Hatton | 241/46 R |
| 3,584,800 | 6/1971 | Dodd | 241/46.06 |

*Primary Examiner*—Granville Y. Custer, Jr.
*Attorney, Agent, or Firm*—Biebel, French & Bugg

[57] ABSTRACT

A waste treatment system which is capable of handling materials of widely different physical characteristics such as glass, metal, and fibrous and plastic waste, incorporates a rotor rotatably mounted in a waste receiving vessel, the rotor being adapted to fracture brittle material, compact malleable material, and otherwise pulverize the frangible waste to a particulate form small enough to be extracted through a perforated plate. The rotor also circulates the material in a slurry form within the vessel in a vortical pattern so that the waste is repeatedly treated until it is ejected from the vessel. A series of space attrition bars are mounted outwardly of the rotor to provide an annularly shaped, discontinuous attrition surface, and hammers or flails are pivotally mounted on the rotor to reduce into smaller pieces materials which are flung upon or between the attrition bars by the rotor. Where the waste material contains a high proportion of rags, tubing and other stringy material, a rotating chopper blade is provided to chop this portion of the waste into smaller pieces which are more readily handled by the rotor and flails. Waste materials which are not readily reduced to a pulverized state by the system are segregated from those which are and removed separately.

16 Claims, 16 Drawing Figures

INVENTORS
EARL T. BLAKLEY,
DAVID E. CHUPKA
DONALD L. HARBRON, JR.
PAUL G. MARSH &
PETER SEIFERT
BY
Marsdal, Biebel, French & Bugg
ATTORNEYS

WASTE TREATMENT SYSTEM

Matter enclosed in heavy brackets [ ] appears in the original patent but forms no part of this reissue specification; matter printed in italics indicates the additions made by reissue.

CROSS-REFERENCE TO RELATED APPLICATION

Application Ser. No. 6,041, filed Jan. 26, 1970, for METHOD AND APPARATUS FOR THE TREATMENT OF GARBAGE AND OTHER WASTES by Joseph Baxter, Jr. now U.S. Pat. No. 3,549,092, and application Ser. No. 861,778, filed Sept. 28, 1969, For Waste Treatment System, of which the present application is a division now U.S. Pat. No. 3,595,488.

BACKGROUND OF THE INVENTION

Municipal wastes will typically include materials of widely varying physical characteristics. These may include fibrous materials, such as paper, cardboard and rags, plastic materials, glass, wire, light gauge metallic containers, and relatively heavy, infrangible materials such as heavy metal pipes and iron castings. It is generally desirable to separate the relatively infrangible materials from those which may be readily broken down to a small particle size, reduce the latter in an aqueous medium and pump the resulting slurry to further treatment stages.

This has conventionally required sorting the waste material prior to reducing the frangible fraction to a size capable of being suspended in an aqueous medium. Additionally, even though the relatively infrangible portion of the waste is removed, the disparate characteristics of the remaining fraction render in them not readily amenable to reduction in a single treatment. This is particularly true where the waste materials contain a relatively high proportion of stringy materials, such as rags, tubing, and the like, as is usually found in waste materials received from hospitals.

It has, therefore, been long recognized that it would be highly desirable to combine in one treatment the functions of separating the relatively frangible and infrangible portions of the waste material and at the same time efficiently reducing the frangible portion to a particulate state, even though the physical characteristics of the frangible portion are quite dissimilar.

SUMMARY OF THE INVENTION

The present invention combines, in one system, a series of elements which cooperate both to segregate the frangible and infrangible portions of the waste material being treated and to pulverize the frangible portion to a particle size which permits the waste to be readily suspended in an aqueous medium for pumping to further treatment stations.

Thus apparatus according to the present invention includes a rotor mounted in a vessel and serving to set up destructive hydraulic shear forces in the vessel when the vessel is loaded with waste materials and a liquid suspending medium. The rotor can be of the disc type but may advantageously be constructed in accordance with the teachings of the patent to Vokes, U.S. Pat. No. 3,073,535. With this type of rotor a plurality of arms are provided which enhance the formation of a vortical flow pattern in the vessel which continuously causes the material to be driven outwardly and upwardly along the sides of the vessel to an overhanging wall of the vessel and then downwardly back into the path of the rotor arms. A perforated extraction plate may be positioned beneath the rotor so that as the waste is reduced to the desired size, the action of the rotor forces this portion of the material in slurry form through the extraction plate into a chamber, where means is provided for conveying the slurry away for further treatment.

An annularly shaped, discontinuous attrition surface is formed by a plurality of spaced attrition bars positioned outwardly of the rotor and engaged by swinging hammers or flails mounted on the rotor. These elements cooperate with the rotor in reducing waste material to the desired size and are particularly effective in reducing tubing, rags and the like. Thus, as tubing, for example, influenced by the vertical flow pattern set up by the rotor, passes between the spaced attrition bars, the rotating flails sever the tubing into shorter lengths. The outer surfaces of the attrition bars extend substantially vertically from the bottom of the treatment vessel and provide an annular pocket into which the currents set by the rotor deposit the relatively heavier, infrangible portions of the material, thereby segregating this portion from that which may be more readily pulverized.

Additionally, where the material contains a high proportion of stringy materials such as tubing and rags, a rotary chopper blade may be mounted in the vessel and positioned so as to receive materials being circulated through the tank by the rotor arms and to chop these materials to a size more readily handled by the rotor, attrition surface and flails, and extraction plate.

Thus the present invention incorporates in one system a series of elements which cooperate both to segregate the relatively frangible and infrangible portions of the material being treated and to subject the frangible portions to a pulverizing action, despite the widely different physical characteristics of the frangible portion, whereby the pulverized frangible portions are transformed into a homogenous slurry which can be readily pumped, transported, dewatered and otherwise treated.

DESCRIPTION OF THE PREFERRED EMBODIMENTS

Figure 1:
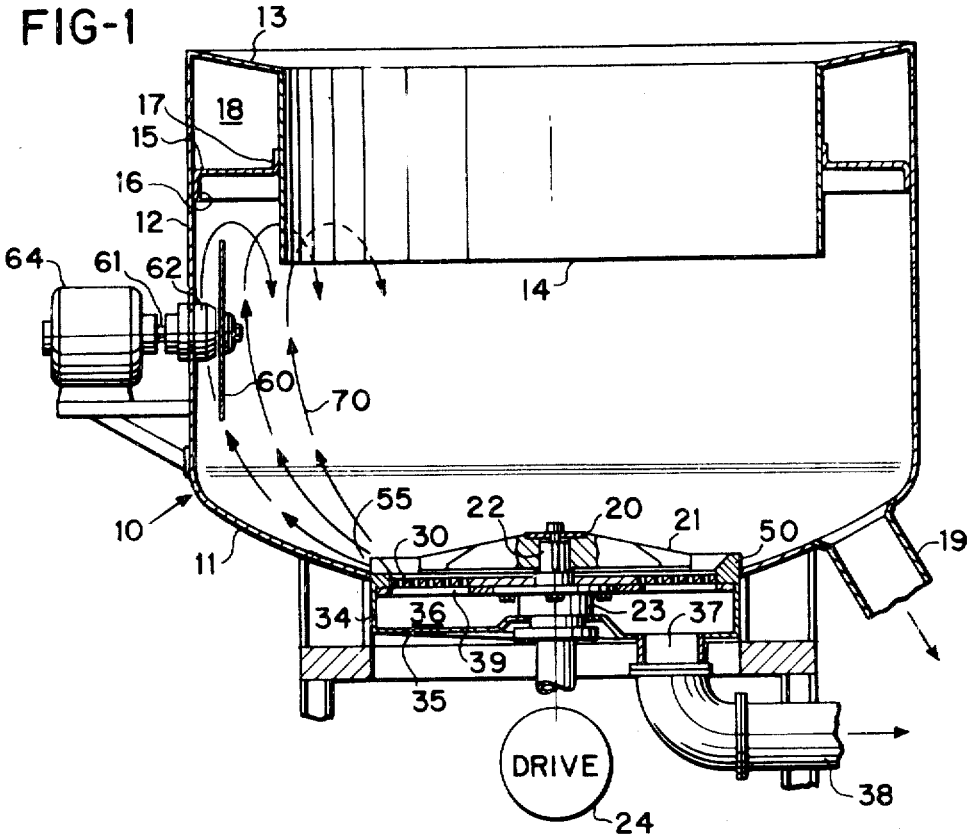
FIG. 1 is an elevational view, partly in cross section, of apparatus of the present invention.

As seen in FIG. 1 of the drawings, apparatus according to the present invention may incorporate a vessel 10 having a bottom wall portion 11 and an upstanding, substantially cylindrical side wall 12. A continuation 13 of the side wall extends inwardly and downwardly and terminates in an overhanging lip 14. A ring 15 is positioned between the side wall 12 and lip 14 with its oppositely projecting flanges 16 and 17 secured thereto to provide an annular space 18, which may be filled with concrete or the like to stabilize theunit against vibrations imposed by the moving parts of the equipment. Extending downwardly from the right-hand side of the vessel as seen in FIG. 1 is a conduit 19 which permits ejection from the system of a portion of the waste as described below.

Figure 2:
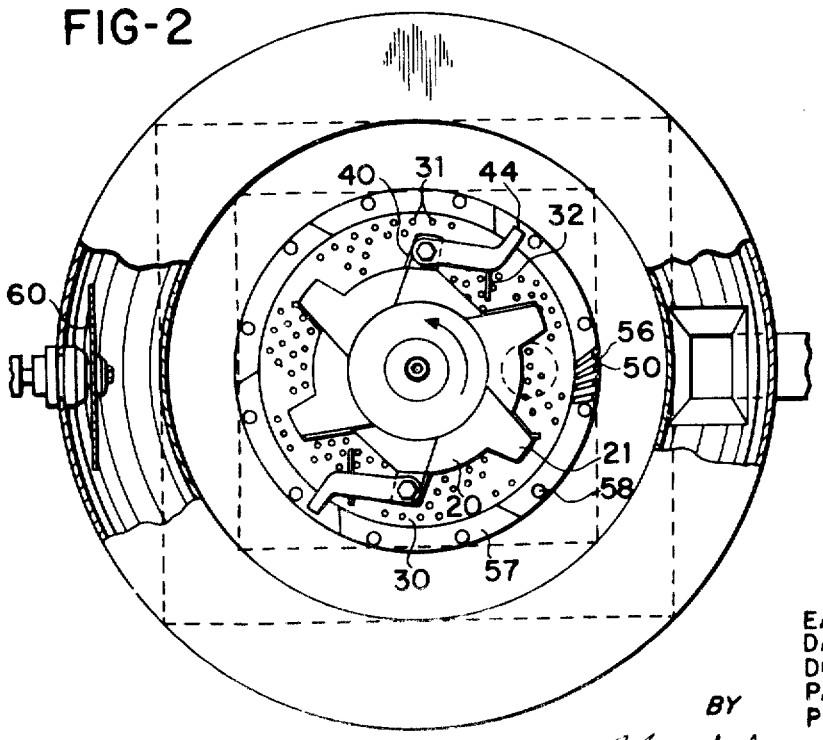
FIG. 2 is a plan view with portions broken away for clarity.
Figure 3:
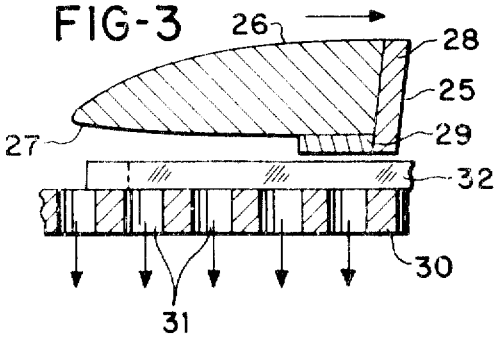
FIGS. 3 and 4 are cross sectional views taken on lines 3—3 and 4—4, respectively, of FIG. 9.

Mounted in the bottom wall of the vessel 10 is a rotor 20 having outwardly projecting arms 21 and rotating in the direction indicated by the arrow in FIG. 2. The rotor 20 may be splined to a shaft 22 mounted in a bearing 23 and extending downwardly into operative association with drive means 24. Each of the arms 21, as best seen in FIG. 3, has a truncated air foil shape with a substantially flat leading edge 25 which is slightly inclined from the vertical in a direction downwardly and away from the direction of rotation of the arms 21. The upper and lower surfaces 26 and 27 of each arm 21 converge towards each other with the lower surface 27 being curved upwardly away from the bottom of the vessel. The leading edge of each arm 21 may be provided with a protective strip 28 of a hardened material such as tungsten carbide or the like, and a deflecting strip 29 of substantially rectangular cross section may be attached to the undersurface of the rotor, as more clearly shown in FIGS. 8 and 9.

The portion of the bottom wall 11 immediately beneath the rotor 20 may be formed as a plate 30 having a series of perforations 31 therein to function as an extraction plate. Affixed to the upper surface of the plate 30, as by welding or the like, is a series of substantially rectangularly cross sectioned deflecting bars 32 mounted in opposition to the similarly cross sectioned rotor deflecting bars 29. It will be noted from FIG. 9 that each of the bars 29 and 32 extends at an angle to the radii of the rotor but in opposite directions, for a purpose to be presently explained. Immediately beneath the extractor plate 30, a support plate 33 is secured to provide, with plates 34 and 35, a substantially toroidal-shaped chamber 36 having an opening 37 therein attached to a conduit 38. Plate 33 is, of course, provided with openings 39 therethrough to permit communication between the vessel interior and the chamber 36 through the perforations 31.

Figure 4:
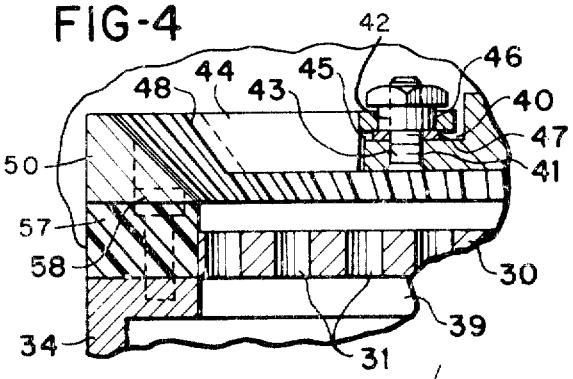
Figure 9:
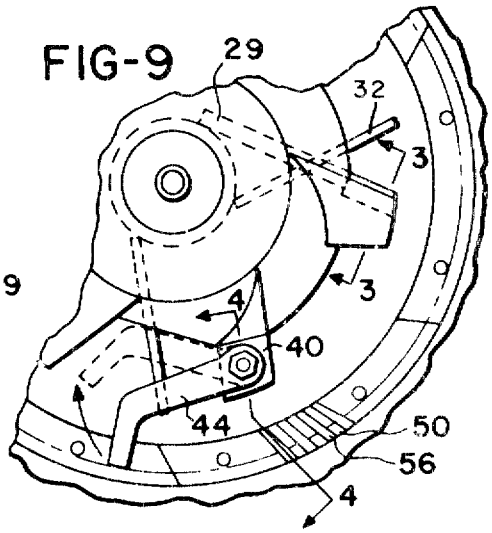
FIG. 9 is a plan view of a portion of the top of the rotor and associated elements.
Figure 8:
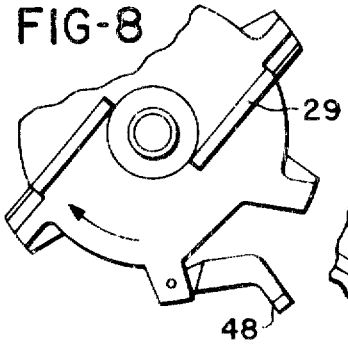
FIG. 8 is a view of a portion of the bottom of the rotor and an attached flail.

At least a pair of oppositely extending arms 21 are modified as seen in FIGS. 2, 4 and 9 by providing a cutaway portion 40 having an opening 41 therethrough to receive a bolt 43. A flail 44 of substantially L-shape has a complementary cut-way portion 45 formed on its inner end with an aperture 46 therethrough for receiving the bolt 43. The bolt 43 may be provided with an enlarged shoulder 42, and a washer 47 is positioned between the opposing portions of the arm 21 and flail 44. Alternatively of course, the shoulder 42 may be replaced by a bushing. The purpose of the shoulder 42, or a corresponding bushing, and the washer 47 is to permit even wear of the more readily replaceable flails, bolts and washers. The outer end of each flail 44 has an upwardly and outwardly beveled surface 48, as best seen in FIGS. 4 and 8.

Positioned outwardly of the rotor 20 are a series of attrition bar members 50 of generally trapezoidal configuration separated by passages 56. The bars 50, as best seen in FIG. 2, are conveniently mounted in units on segment plates 57, which may be secured to the support plate 33 by means of bolts or the like 58 (See also FIG. 4). The trapezoidal configuration of the bars 50 provides, in addition to the upper and lower parallel sides 51 and 52, a pair of non-parallel sides 53 and 54, each of which serves an important function in the apparatus of the present invention.

The substantially vertically oriented surface 53 of each of the bars forms a pocket 55 in the lower portion of the vessel 10 for a purpose to be presently explained and the surfaces 54 of the bars 50, which are complementary to the surface 48 of the flail 44, collectively define an annularly-shaped, discontinuous attrition surface. While a pair of oppositely positioned flails 44 have been described for purposes of illustration, it will be apparent that the number of flails utilized may be varied as desired, the only limitation being the avoidance of an unduly unbalanced system.

Figure 7:
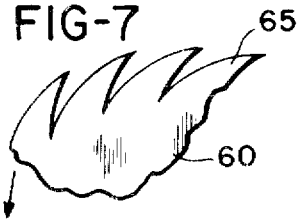
FIG. 7 is a view of a portion of the chopper blade.

A chopper blade 60 is shown in FIG. 1 as mounted in the side wall 12 of the vessel 10 on a shaft 61 which extends through the side wall and is shrouded at 62 and attached to a source of power 64 mounted outwardly of the vessel 10. As best seen in FIG. 7, the chopper blade 60 may be of saw-toothed construction with the teeth 65 of the blade inclined away from the direction of rotation of the blade.

The apparatus thus far described may be operated on either a continuous or a batch basis. However, it will generally be preferable to operate on a continuous basis, and the description of the operation is therefore directed to a continuous process, although it will be apparent that it has facility in a batch process as well.

In operation, waste material is delivered to the vessel 10 together with a change of liquid, which may initially be fresh water but which, as will be explained below may quite advantageously be raw sewage from a municipal sewage system. The consistency of the mixture in the vessel 10 will vary depending upon the amount of glass, metal and the like in the vessel. Thus, if there is a high percentage of these materials, the consistency may be as high as 10 percent. However, the consistency of the slurry passing through the plate will preferably be approximately 2 to 6 percent solids, and the total amount of material will usually be kept rather low to provide a more efficient reducing and segregating operation.

The rotor 20, which may operate at a peripheral speed of approximately 1,000 to 6,000 feet per minute, establishes a vortical circulation path in the vessel, as indicated by the arrows 70, which subjects the material in the vessel to severe hydraulic shear forces. In this regard is should be noted that the horsepower to volume ratio is preferably maintained relatively high to insure a vigorous flow pattern, with the volume of material treated ranging from 1.5 to 7.5 cubic feet per unit of horsepower expended. This serves to break up a portion of the waste material to smaller sizes and appears to be particularly effective in reducing fibrous materials such as paper, cardboard and the like.

In addition to the attrition caused by hydraulic shear, the arms 21 also exert a mechanical destructive force on the waste. Thus the leading edge of each arm 21, protected by the hardened strip of material 28, defines an impacting surface which extends nonparallel to the plane of rotation of rotor 20 and batters the objects it encounters as it sweeps about the bottom of the vessel, serving to compact light gauge metallic containers such as aluminum and tin cans and fracturing relatively brittle materials such as glass into small particles.

The inclined leading edge of each of the arms 21 also tends to direct the waste material downwardly towards the extractor plate 30, where, if it is of a sufficiently small size, it passes through the apertures 31 and thence, into the toroidal chamber 36 from which it may be evacuated by the conduit 38. Material which is forced down toward the plate 30 but is too large to pass through the apertures 31 is sucked upwardly from the surface of the extractor plate by the negative pressure exerted by the passage of the upwardly curved surface 27 of each of the arms 21, and this upward and downward plusation provides an additional comminuting action. The deflector bars 29 and 32 cross each other in scissors fashion and serve to cut and otherwise sweep out any oversize gritty particles which tend to become lodge between the surfaces of the rotor and the extractor plate 31.

Stringy material, such as rags and tubings, will be flung outwardly by the rotor toward the attrition bars 50. The space between these bars will preferably be dimensioned to be greater than the diameter of the types of tubing and the like which are likely to be encountered so that the majority of such tubing may pass between the bars. Therefore, as the tubing passes between the bars 50 it will be served into shorter lengths by the outer end of the flails 44, which are impelled outwardly by centrifugal force and engage the annularly-shaped discontinuous attrition surface defined by the inclined surface 54 of the bars 50.

Figure 6:
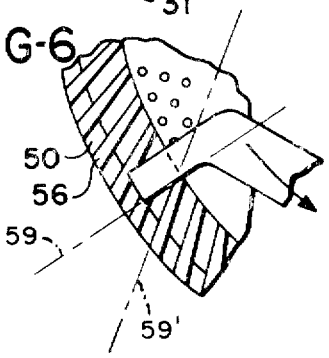
FIG. 6 is a plan view of a portion of one of the flails and the discontinuous attrition surface.
Figure 5:
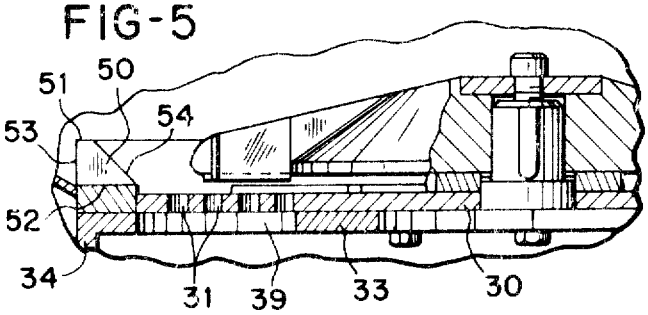
FIG. 5 is an enlarged cross sectional view of a portion of the apparatus of the present invention showing structure adjacent the rotor of the system.

Because of the pivotal mounting, if a piece of hard waste material is encountered by a flail, it will move away from the direction of movement of the rotor, in the manner indicated by the arrow in FIG. 9, and damage to the flail prevented. Preferably, the outer ends 48 of the flails 44 are dimensioned to be wider than the space 56 between adjacent bars 50 to prevent the flails from being jammed between adjacent bars and damaged. Additionally, the spaces 56 between adjacent attrition bars taper outwardly, as best seen in FIGS. 2, 6 and 9, to prevent material from becoming lodged between them, and the bars are angularly oriented with respect to the radii 59 of the rotor so as to be aligned with the outward flow created by the rotor 20 and indicated at 59' in FIG. 6.

As noted previously, the consistency of waste material in the vessel 10 is deliberately kept at a level which allows the material to circulate in the vortical pattern indicated by the arrows 70. Thus, it is redirected downwardly back into the rotor and associated flails, thereby repeatedly subjecting the material to an extremely severe treatment. In this regard the overhanging lip 14 prevents material from being flung from the vessel when the amount of material in the vessel necessitates it. Heavier, relatively infrangible waste such as heavy gauge steel or cast iron, is also flung outwardly by the rotor where it tends to follow the general direction of the arrows 70. However, because of its greater weight, it will only travel a short distance up the bottom wall of the vessel and will then fall downwardly, where it migrates to the general vicinity of the pocket 55 formed by the vertical surfaces 53 of the attrition bars members 50. Continued circulation and accumulation of this relatively heavy infrangible material continues until the natural circulation within the vessel causes this portion to be ejected from the vessel 10 through the conduit 19. Thus rather than the relatively infrangible portion of the waste being retained in the system, where it would not only subject the system to excessive wear but would also occupy volume which could be best utilized by the more frangible portions of the waste, it is instead segregated and delivered out of the system at an early stage.

While the system as thus far described operates efficiently in segregating the relatively frangible and infrangible portions of the waste and in pulverizing the frangible portion to a particulate size, in certain instances where the waste contains a high proportion of stringy or ropy materials such as tubing and rags, additional means may be provided for breaking down this stringy material to a size more readily handled by the rotor and associated flails.

Thus as seen in FIGS. 1 and 2, the rotating, sawtoothed, chopper blade 60 rotating at a peripheral speed for 4,000–12,000 feet per minute may be mounted in the side wall of the vessel 10 in the path of the material flung outwardly and upwardly by the rotor 20; whereby any stringy or ropy portions are chopped into shorter lengths which are more conveniently handled by the rotor 20 and flails and attrition bars. In practice it has been found that if a chopper blade is not used in situations in which the proportion of stringy material is high, this material may wind into an increasingly larger bail and greatly inhibits the effectiveness of the operation.

Figure 11:
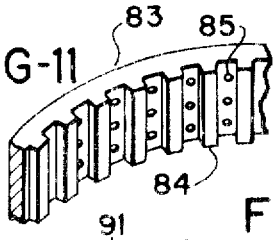
FIG. 11 is a perspective view of a portion of the attrition plate of FIG. 10.
Figure 10:
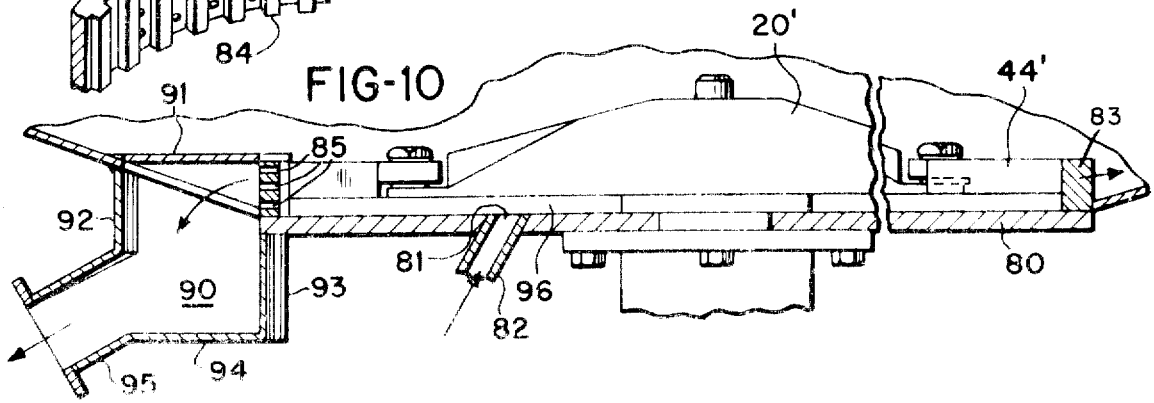
FIG. 10 is a cross sectional view of a portion of apparatus according to a modified form of the invention.

Turning now to FIGS. 10 and 11 of the drawings, a second preferred embodiment of the invention will be described. The embodiment of FIGS. 10 and 11, as in the case of the embodiment of FIG.. 1, incorporates a rotor 20' in which certain arms thereof are modified for the attachment of flails 44' thereto. However, unlike the previous embodiment, the bottom wall portion 80 beneath the rotor 20' is, with the exception of the opening 81 accommodating the conduit 82, relatively imperforate. Additionally, the annular attrition surface is formed as an annular plate 83 having spaced ribs 84 formed thereon and a series of passages 85 extending through a portion of the plate 83 into the chamber 90.

The chamber 90 is coextensive with the apertured portion of plate 83 and is formed by the cover plate 91, substantially vertically extending walls 92 and 93 and a bottom wall 94, with egress from the chamber being provided by the conduit 95. Thus rather than the particulate material produced by the system being directed downwardly through an extraction plate, as in the embodiment of FIG. 1, it is ejected outwardly through the openings 85 in the apertured portion of the plate 83 and thence into the chamber 90, where it is drained by the conduit 95. The conduit 82 may be connected to a source of fluid under pressure which may be either intermittently or continuously delivered to the space 96 between the bottom of the rotor and the plate 80 and thereby assist in preventing an accumulation of material in this area.

Figure 12:
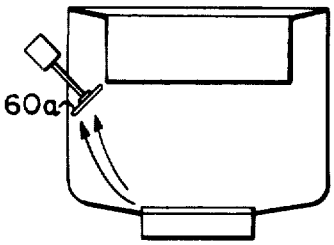
FIGS. 12–14 are somewhat schematic representations showing the various positions the chopper blade may assume according to the principles of the present invention.
Figure 13:
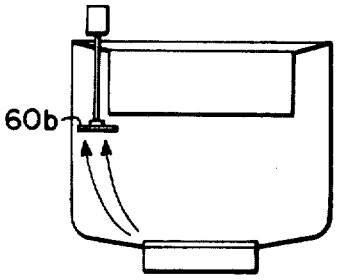
Figure 14:
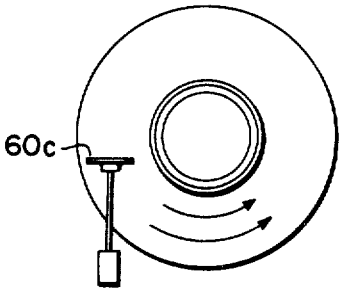

In the embodiment shown in FIG. 1 of the drawings, the axis of rotation of the chopper blade 60 is normal to the axis of rotation of the rotor 20 and on a line which would intersect a line running through the axis of rotation of the rotor. It will be noted from FIGS. 12, 13 and 14 of the drawings, however, that it is within the scope of the present invention to provide alternate mountings for the blade 60. Thus as seen in FIG. 12, the axis of rotation of the chopper blade 60a may be angularly disposed with respect to the axis of the rotor 20. Alternatively, as seen in FIG. 13, the axis of rotation of the chopper blade 60b is parallel to that of the rotor. FIG. 14 shows yet another embodiment wherein, although the axis of rotation of the chopper blade 60c is again normal to that of the rotor, it is offset with respect thereto. While in all of the embodiments shown only a single chopper blade is utilized, it will be apparent that multiple choppers can also be used to advantage, particularly in large installations.

Figure 15:
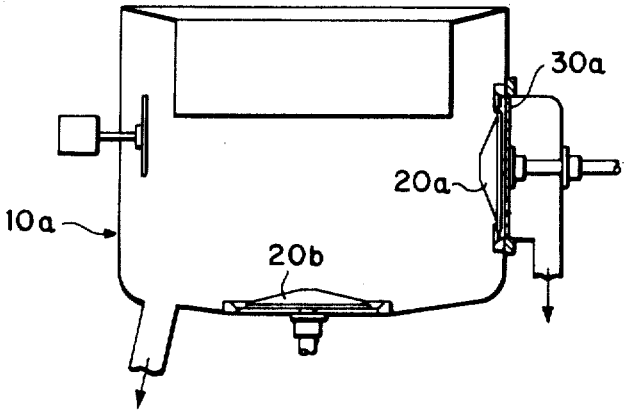
FIG. 15 is an elevational view showing a further embodiment of the present invention.

In FIG. 15 a further embodiment of the present invention is shown wherein a rotor 20a is provided mounted in the side wall of the vessel 10a. In this position the rotor is removed from the heavier materials which tend to collect at the bottom of the vessel. While the rotor 20a is shown as associated with an extraction plate 30a, it will be appreciated that the rotor may instead be associated with construction of the type shown in FIG. 10. Additionally, a second rotor 20b could also be provided with its axis extending normal to the axis of rotor 20a.

Figure 16:
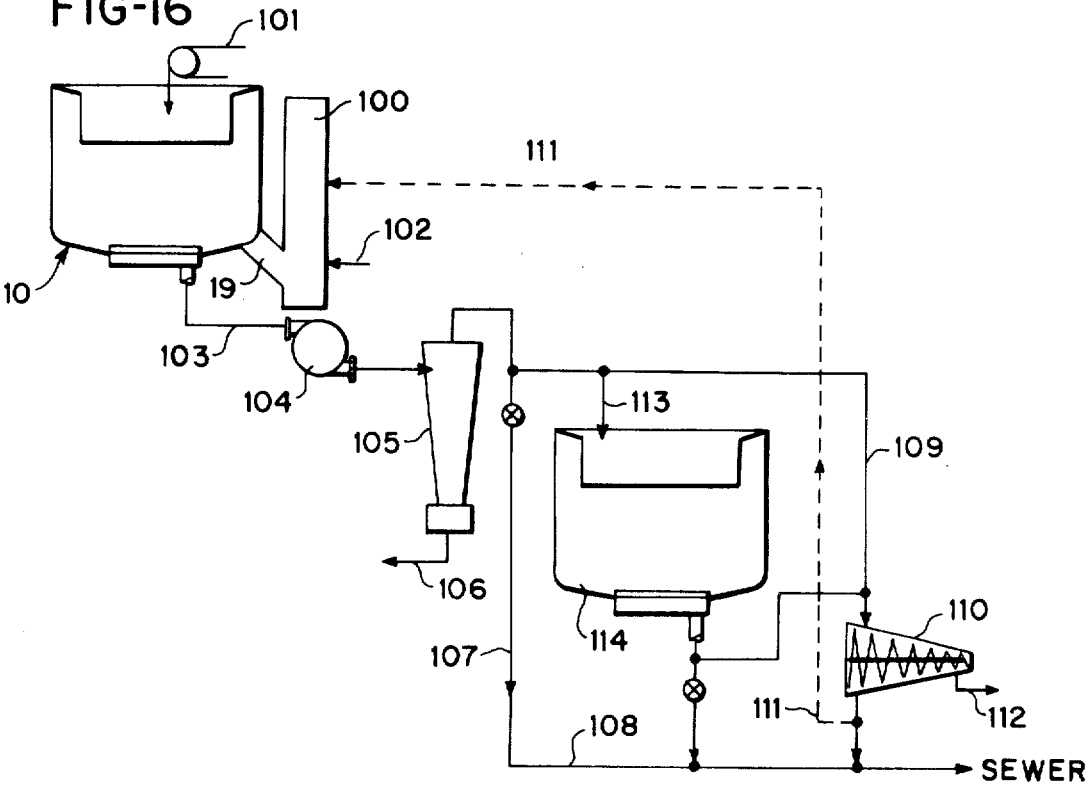
FIG. 16 is a somewhat schematic representation of a complete waste treatment system.

FIG. 16 of the drawings somewhat schematically represents a complete system in which the apparatus of the present invention may be utilized. Thus a trash segregating and disintegrating unit, including a vessel 10, may be associated with a junk catcher 100 by means of a conduit 19 and continuously charged with waste material by means of the conveyor 101. Liquid, preferably water, may be fed to the vessel 10 by means of a line 102 connected to the junk catcher 100 and in communication with the vessel 10 via the conduit 19. The slurry of pulverized waste material and liquid passes from the vessel 10 by means of the conduit 103 and is pumped by means of the pump 104 to a separator 105, which may conveniently be of the cyclone type and which serves to separate gritty materials from the slurry. Grit thus separated from the slurry of waste material may be ejected through the line 106 and collected for disposal by land fill methods or utilized as an aggregate in low load bearing structures. The remaining slurry of waste material may then be conveyed by means of the line 107 to a sewer line 108. Since the grit has been removed in the cyclone there is no danger of it settling out in and clogging the sewer.

Alternatively, the accepts from the cyclone 105 may be passed through a line 109 to a thickener 110, which may conveniently be of the screw type. Liquid expressed at the thickener 110 may then be conveyed back to the junk catcher by means of line 111 in place of or in supplement to the liquid from the conduit 102. The relatively high consistency material delivered by the thickener 110 may then be passed through the line 112 to a conventional incinerator, an incinerator of the fluidized bed type, or otherwise disposed of.

It is also possible to use the apparatus of the present invention in a system wherein the waste material is treated in more than a single comminuting operation. Thus the openings through which the pulverized material in the vessel 10 are expressed into the line 103 may be relatively large, for example, on the order of ½–1½ inches, with the waste material consequently receiving only a fairly coarse treatment. This coarsely divided waste material may then be conveyed to the cyclone separator 105 to remove the grit fraction of the waste, and the accepts from the separator delivered through a line 113 to a second apparatus 114 which may be, but not necessarily is, of the same type as apparatus 10 and which has openings therefrom on a much smaller order of magnitude, for example, three-eights of an inch, than the apparatus thereof. The waste material passing from this apparatus may then be treated as described above. A system which incorporates a multiple stage comminuting process has the advantage of a higher throughput rate, since the retention time in each stage need not be as long, and reduced equipment wear, particularly in the stages downstream of the separating apparatus.

From the above, it will be apparent that the present invention provides apparatus which through a unique cooperation of elements, permits, in a single continuous operation, the segregation of the relatively frangible and infrangible portions of waste material, and the reduction of the frangible portion to a desired particulate size, despite widely varying physical characteristics of the waste.

While the forms of apparatus herein described constitute preferred embodiments of the invention, it is to be understood that the invention is not limited to these precise forms of apparatus, and that changes may be made therein without departing from the scope of the invention.

What is claimed is:

1. A waste treatment system comprising:

a. a vessel *adapted to receive relatively frangible and infrangible material therein for treatment, said vessel* including an upstanding side wall portion, b. a rotor mounted in said vessel, c. means defining a discontinuous attrition surface mounted in said vessel intermediate said side wall portion and said rotor, d. said side wall portion being of appreciably greater extent in a direction parallel to the axis of rotation of said rotor than said attrition means, e. said discontinuous attrition surface being spaced from said side wall portion to accommodate material flow through and over said attrition surface into [ said space ] *the space between said attrition surface and said side wall portion* and upwardly along said side wall in a vortical pattern, f. flail means mounted on said rotor and projecting outwardly therefrom, g. said flail means being mounted on said rotor for movement with respect thereto and engagement with said attrition means.

2. The apparatus of claim 1 wherein:

a. at least a distal portion of said flail means is engageable with said attrition surface, and b. said distal portion of said flail means and the portion of said attrition surface engageable thereby are complementary in shape.

3. The apparatus of claim 1 wherein:

said flail means are pivotally mounted on said rotor.

4. The apparatus of claim 3 wherein:

a. said attrition surface is defined by one edge of a series of bar members, and b. said bar members are positioned about said rotor in spaced relationship to each other.

5. The apparatus of claim 4 wherein:

a. said bar members are angularly disposed with respect to the radii of said rotor, and b. the spacing between said bar members increases in a direction away from said rotor.

6. The apparatus of claim 4 wherein:

a. said bar members are substantially trapezoidal in configuration.

b. one of the non-parallel edges on each of said bar members extends substantially parallel to the axis of rotation of said rotor and defines an annular pocket surrounding said bar members, c. the other non-parallel edge of each of said bar members constitutes said discontinuous attrition surface defining means, and d. means is provided for evacuating said pocket.

7. The apparatus of claim 3 wherein:

a. said flail means are substantially L-shaped.

8. The apparatus of claim 1 further comprising:

a. a chopper blade mounted in said vessel in spaced relationship to said rotor.

9. The apparatus of claim 8 wherein:

a. said chopper blade is rotatably mounted, and b. said chopper blade is of saw-toothed configuration.

10. The apparatus of claim 9 wherein:

a. the surface of the teeth of said chopper blade are curved with respect to the radii thereof in a direction opposite to the direction of rotation of said chopper blade.

11. The apparatus of claim 1 further comprising:

a. a foraminous wall positioned beneath said rotor.

12. The apparatus of claim 1 wherein:

a. said attrition surface defining means comprises an annularly shaped plate having a series of passages extending therethrough.

13. The apparatus of claim 12 wherein:

a. a series of ribs are mounted on an inner surface of said annular plate and project inwardly toward said rotor, and b. a chamber is positioned outwardly of said annular plate opposite the apertured portion thereof.

14. Apparatus of the type described comprising:

a. vessel having a bottom wall, a substantially cylindrical side wall, an inwardly projecting top wall and a downwardly extending lip, b. a rotor having outwardly extending arms mounted in said bottom wall, c. a portion of said bottom wall beneath said rotor having perforations formed therethrough and a chamber positioned beneath said portion, d. at least two of said arms having L-shaped flails mounted thereon and projecting outwardly toward said side wall, e. a series of trapezoidally shaped bars arranged outwardly of said rotor in spaced relation to each other to define a substantially inwardly and downwardly extending discontinuous attrition surface, f. the outer portion of said flails being beveled to a configuration complementary to said attrition surface and engageable thereby, g. an outermost portion of each of said bars defining with a section of said bottom wall a substantially annularly-shaped pocket, h. said bars being oriented at an angle to the radii of said rotor, with the spacing between said bars increasing outwardly of said vessel and the spacing of the inner edges of said bars being smaller than said beveled portion of said flails, i. an outlet from said vessel positioned adjacent a portion of said pocket, and j. a rotatable chopper blade mounted in said vessel with the axis thereof spaced from the axis of said rotor, k. said blade being of saw-toothed configuration with the teeth curved in a direction away from the direction of rotation of said blade.

*15. The apparatus of claim 1 further comprising:*

*a. means defining an outlet from said vessel adapted to remove said relatively infrangible material therefrom.*

*16. The apparatus of claim 15 wherein:*

*a. said space between said attrition means and said side wall portion is substantially annular, and*

*b. said outlet from said vessel communicates with said annular space.*

* * * * *